Oct. 24, 1967   S. B. MATTSSON   3,348,497
SWITCHING MEANS FOR TRACK SYSTEM
Filed June 1, 1965   5 Sheets-Sheet 5
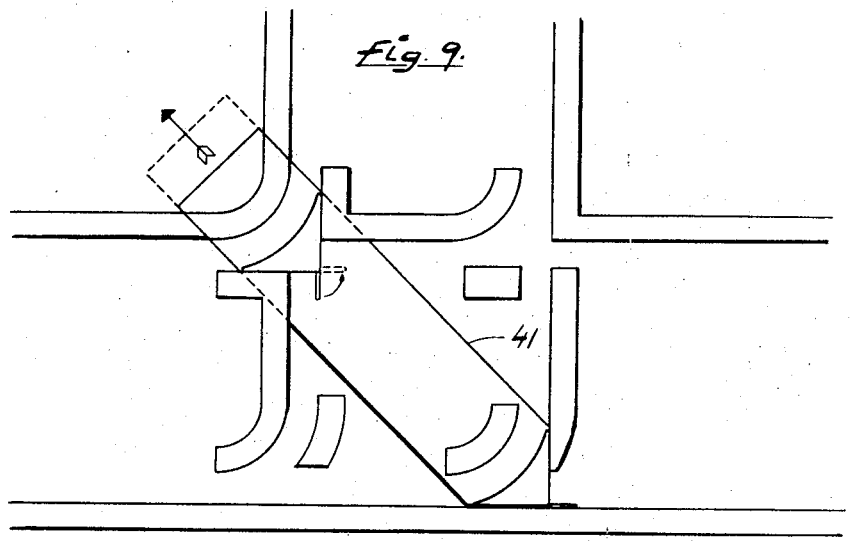
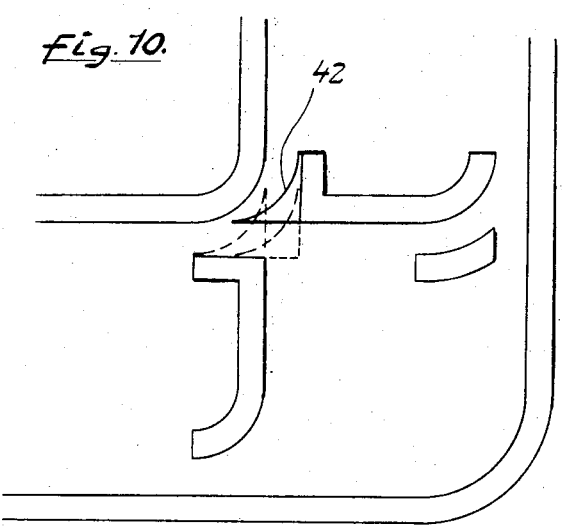
INVENTOR.

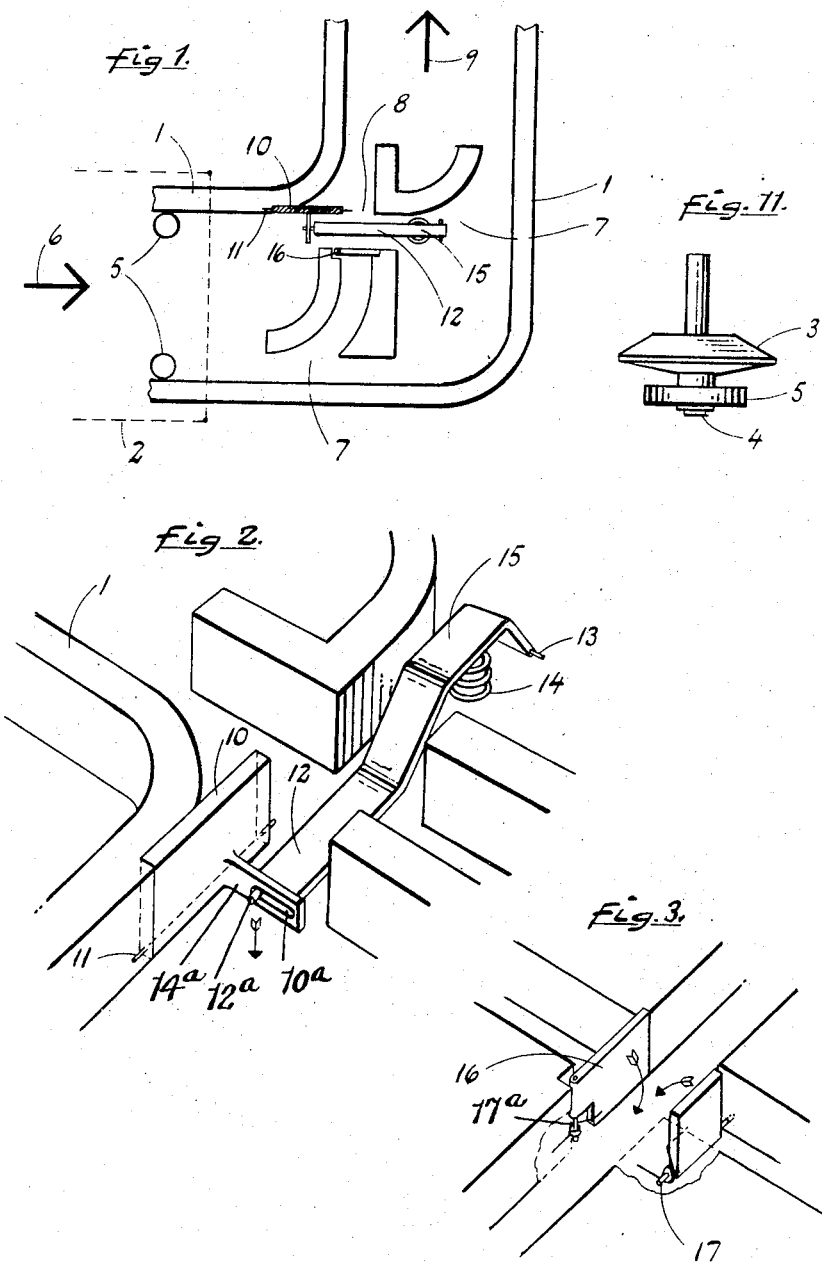

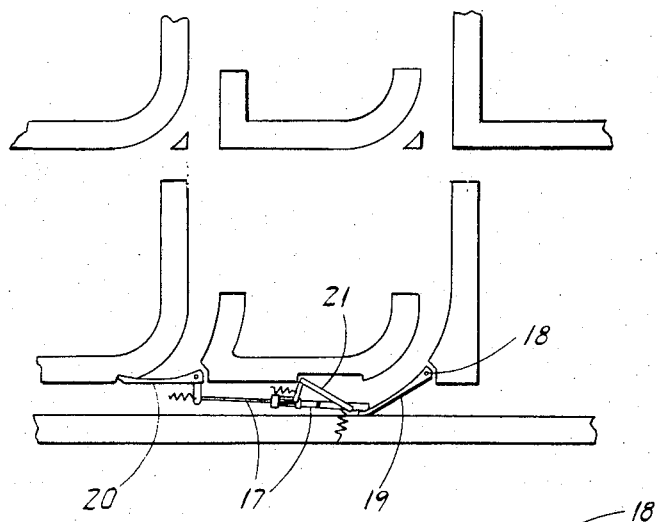
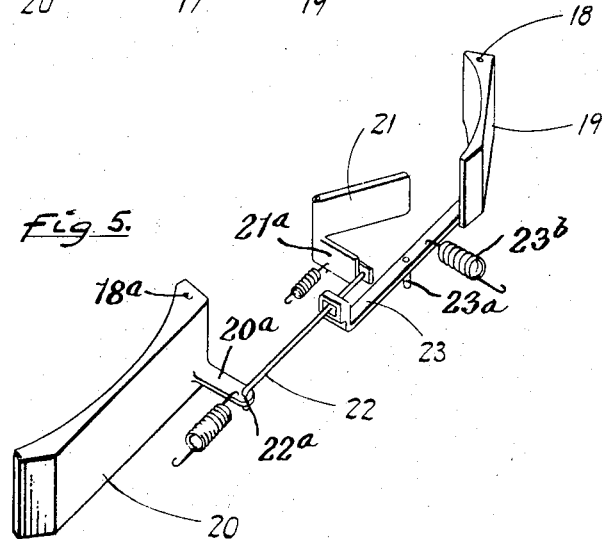

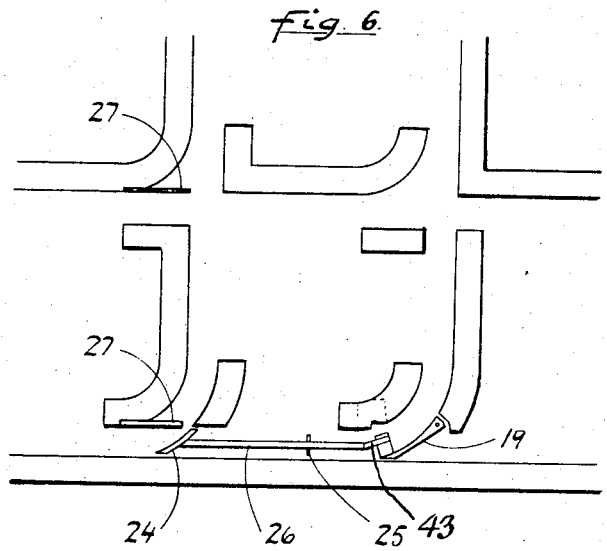
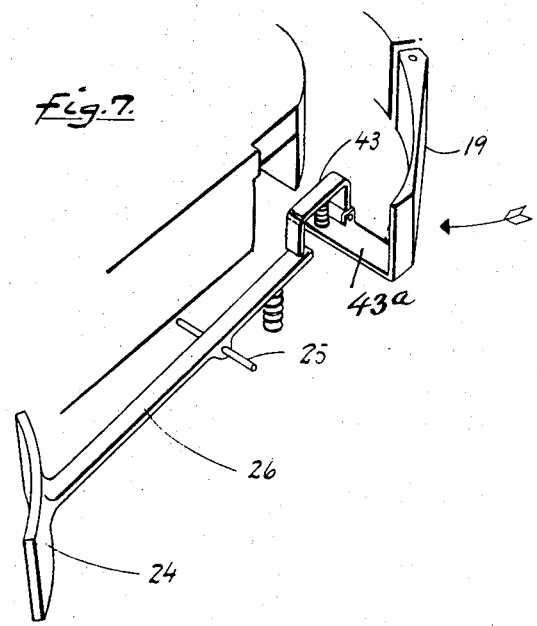

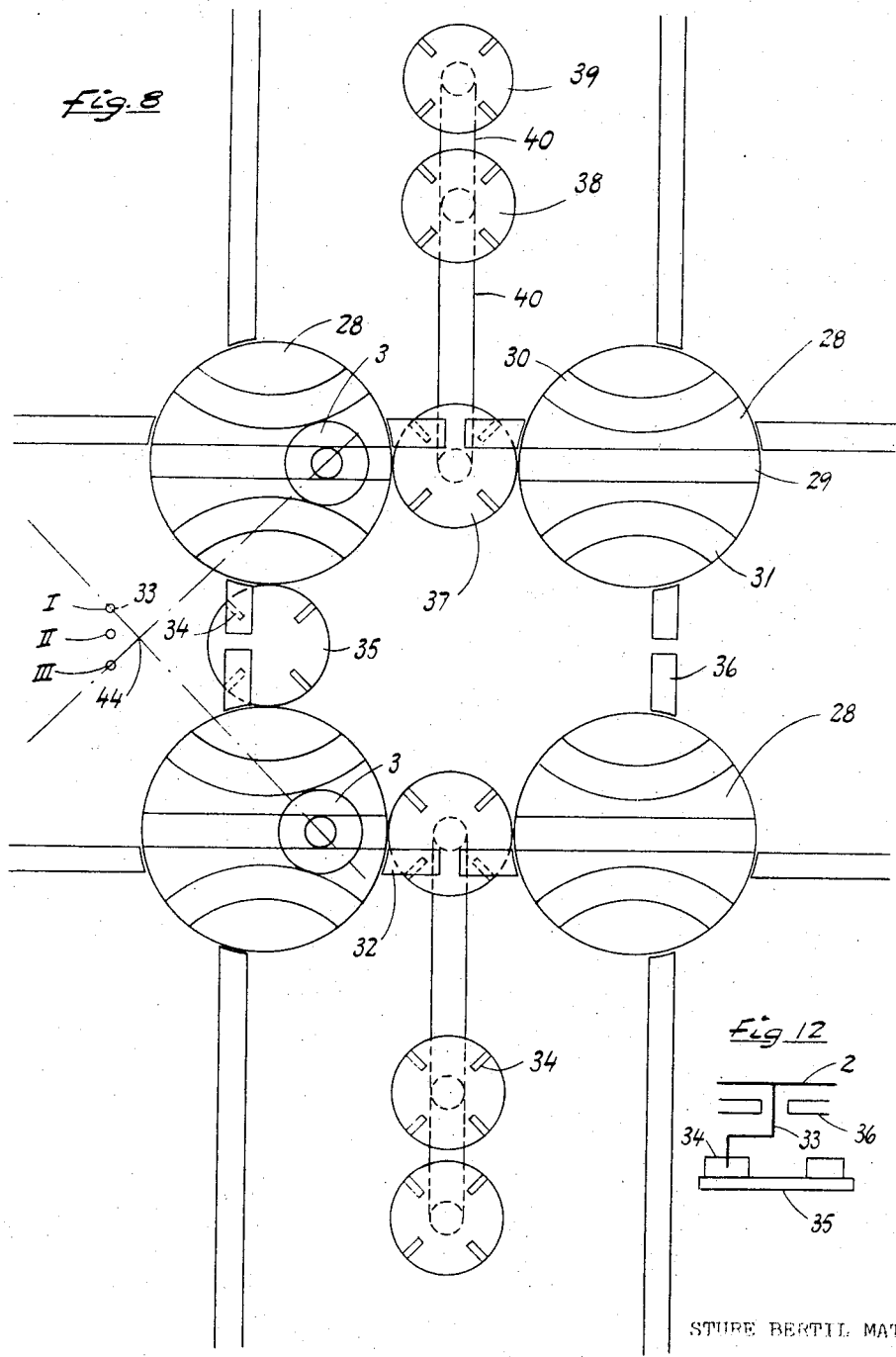

United States Patent Office 3,348,497
Patented Oct. 24, 1967

3,348,497
SWITCHING MEANS FOR TRACK SYSTEM
Sture Bertil Mattsson, Norrkoping, Sweden, assignor to Borgs Fabriks AB, Norrkoping, Sweden
Filed June 1, 1965, Ser. No. 460,237
Claims priority, application Sweden, June 18, 1964, 7,507/64
6 Claims. (Cl. 104—130)

ABSTRACT OF THE DISCLOSURE

Switching means for trucks equipped with wheels operating on tracks and with the wheels rotative on axles arranged at right angles to the plane of the tracks. Said trucks are adapted to be switched to branch tracks and particularly to branch tracks that extend at substantially right angles to the main tracks. The trucks are adapted to make the required switching movements without necessitating swivelling or bodily rotation of the bodies of the trucks. The switching means includes blocking elements which are movably disposed at the junction of the main tracks and the branch tracks and which elements are arranged to permit the passage of the front wheels of a truck past a certain point whereby means contacted by said front wheels will shift the blocking elements to thereby open the entrance to the branch track and thereby permit the wheels of the truck to enter the branch track and proceed along the same without having imparted a bodily turning movement to the truck.

This invention relates to switching means for a track system for trucks equipped with running wheels which rotate around axles, that for the most part, are arranged at right angles to the plane of the track on which the trucks are moved. The switch is primarily used to transfer a truck from one track to a crossing or branch track without swivelling the truck. This permits right-angle movements of the truck that save space, especially for transportation within a room or other enclosure.

A known disadvantage of present switching methods is that the trucks must be braked, stopped and re-accelerated during switching. In an effort to avoid these time-consuming and costly changes in direction of the trucks, it was found necessary to install a track with a curve, but this not only reduced the space-saving desirability, but necessitated the swivelling of the truck around a vertical axis and this in certain cases has caused difficulties. These disadvantages are avoided by the use of the present invention which permits each wheel to run in a curve individually so that switching is accomplished without requiring swivelling of the truck and as a result nothing has to be altered on presently existing trucks adapted for the track system under consideration.

The invention is principally characterized in that at least one of the crossing or branched points is provided with guides that permit both a linear movement in the original direction of movement of the truck and a movement along a curved line during the switching and for the movement in a new direction.

With these and other objects to be hereinafter set forth in view, I have devised the arrangement of parts to be described and more particularly pointed out in the claims appended hereto.

In the accompanying drawings, wherein illustrative embodiments of the invention are shown, FIG. 1 is a top plan view of a track system showing one embodiment of the invention;

FIGS. 2 and 3 are detail views of the switch mechanism employed in the structure of FIG. 1;

FIG. 4 is a top plan view of another embodiment of the invention;

FIG. 5 is a perspective view of the elements of the switching mechanism employed in the arrangement of FIG. 4;

FIG. 6 shows an arrangement which includes a pivoted barrier that is raised and lowered;

FIG. 7 is a perspective view of some of the elements employed in the arrangement of FIG. 6;

FIG. 8 shows an arrangement in which rotative switching discs are employed;

FIG. 9 shows a switching arrangement embodying a slidable shifting device;

FIG. 10 shows another form of switch means;

FIG. 11 shows one of the wheels used on the truck, and

FIG. 12 schematically shows a detail from FIG. 8.

In FIG. 1 is shown an L-shaped track 1, the truck moving along the same in the direction of the arrow 6, being partly shown in the dotted lines at 2. The truck has four wheels which are arranged at right angles to the plane of the truck. Two of these wheels are shown at 5, and the construction of each of these wheels is disclosed in FIG. 11 wherein it will be seen that the wheel 3 is rotatively mounted on an axle 4 and carried on the axle, below the wheel, is a bearing 5 which contacts the edges of the track 1 so that the truck is properly guided by the track.

As the truck moves along the track 1 in the direction indicated by the arrow 6 in FIG. 1, the front wheels of the truck will continue straight forward past the points indicated at 7 and 8. When the front wheels reach this position and are to be turned in a manner to cause the truck to move in the direction of the arrow 9, the back wheels of the truck will then have reached the points 7 and 8 so that the truck can now roll in the direction of the arrow 9 without requiring swivelling of the truck around a vertical axis.

Located at the point 8 is a guide in the form of a plate 10 which is arranged so that it can be lowered on horizontally-disposed pins 11 (FIG. 2) at the bottom of the track. A lever 12 is provided with a pin 12a which engages a slot 10a in an arm 14a projecting from the plate 10. At its opposite end, the lever 12 is pivoted on pins 13 and the lever is actuated by a spring 14 located beneath it. The lever 10 is formed with an elevated end portion 15 below which the spring 14 is located. This arrangement is such that the plate 10 in its raised position shown in FIG. 2, guides the front wheels of the truck past the point 8 when the truck is travelling in the direction of the arrow 6. The front wheels then depress the lever 12, whereupon the lever 12, by means of its coupling to the arm 14a of the plate 10, will cause the plate 10 to be lowered and permit the rear wheels of the truck to be moved through the space or gap 8 to allow the truck to be then moved in the direction of the arrow 9, or at right angles to its former movement as indicated by the arrow 6.

At crossings in the track it can also be suitable to provide a barrier in the form of a spring-loaded plate 16, clearly shown in FIG. 3, such plate 16 being pivoted vertically at one edge as shown at 17a, or pivoted longitudinally on pins 17. This provides a guide for the front wheels of the truck but which is caused to be knocked up by the back wheels of the truck when the direction of movement of the truck is changed.

In FIGS. 4 and 5 is shown a T-type switch arrangement provided with flaps and barriers. The openings or gaps in the track are provided with pivoted flaps indicated respectively at 19 and 20. The flap shown at 19 is rotative on the pivot pin 18a. When these flaps are in their closed positions, the truck moves straight ahead without turning off. When switching is accomplished the flap 19 has been actuated so that it assumes the position shown in FIGS. 4 and 5. The front wheels of the truck pass the flap 20, then in closure position and strike a projecting, pivoted flap 21 which, by means of a projecting arm 21a exerts a pull on a rod 22, connected at 22a to a lug 20a projecting from the flap 20, and moves the flap outwardly so that it guides the rear wheels of the truck around the curve in the track.

If the flap 19 is in a position of closing off the entrance to the curved part of the track, the pull on the rod 22 permits lever 23 to swing on its pivot 23a and under the pull of the spring 23b to be swung to the position shown in FIG. 4 so that at this time the entrance to the curved part of the track will be open and the truck can move through the turn.

In FIGS. 6 and 7 is shown a vertically adjustable barrier 24 provided at the end of an arm 26 supported so that it can rotate around a pivot pin 25. When switching takes place in a track of the type shown in FIG. 6, guide plates 27 are in raised position to guide the front wheels of the truck straight ahead. After the front wheels pass the guide plates, the flap 19 is moved to its out position, or that shown in FIG. 6, whereupon a spring-actuated yoke 43, supported by a leg 43a on the flap 19 rests upon the arm 26 adjacent to one end thereof. Yoke 43 is depressed by the truck and this elevates the arcuately-shaped barrier 24 to switching position for the rear wheel of the truck and the truck thereupon changes its direction of movement.

In FIG. 8 is shown a switch provided with rotatable discs 28 and with guides in the form of straight, diametrical track edges 29 and curved track edges 30 and 31 for switching in both directions. In this embodiment of the invention, the direction changes are made in the following manner:

A truck arriving from the left as viewed in FIG. 8, passes over the two left-hand discs. When the front edges of the truck rest on the track sections 32 located between the switching discs, a driving pin 33 mounted on the truck, actuates a cam 34 on a turntable 35, so that the turntable rotatively moves. Since the turntable 35 and the other turntables shown engage the switching discs by means of a friction drive or through gears, they can be driven and switched, these latter being turned 45 degrees and the truck can now turn 90 degrees along the curved tracks. When the rear wheels are located on the track sections 36 between the discs, pin 33 actuates a turntable 37 so that the switching discs rotate 45 degrees, that is, track sections 36 are joined, by means of straight track 29 with the outer track, and the truck can leave the switch. When this has happened the drive pin actuates turntables 38 and 39 in the order mentioned. Turntables 38 and 39 are joined to turntable 37 by means of chains 40 and since the turning of each disc causes the switching disc to rotate 45 degrees, a total rotation of 90 degrees is obtained. That is, the switch is returned to its original position after the truck has left it.

This required rotary motion can easily be performed by means of the truck itself through an arrangement whereby for every switching motion upward or downward, the appropriate device is raised or lowered by means of a projection or element on the truck suitably located for this purpose and capable of producing a rotary motion. This rotary motion requires very little energy since it is performed during a time when the truck wheel is not on the switching disc under consideration, and this is one of the factors which distinguishes this arrangement of switching from other known constructions.

In FIG. 12 the driving pin 33 is shown as being attached to the bottom of the truck 2. The numeral 44 designates the center of the truck. It is rotatable to three positions which, in FIG. 8 are designated at I, II and III. In position II none of the cams 34 on the turntable are actuated and the switching discs do not change position. At positions I or II the turntables are turned so that the truck moves in the desired direction.

It is obvious that a switching disc arranged for a simpler switch than a complete cross switch can be readily produced. The detailed designs of the switching discs can be varied as compared with those described. Similarly, one can if desired use direct actuation of the switch discs from a motor, hydraulic or pneumatic cylinders or the like, in all steps in the cycle. It is also possible to arrange for a combination of the types of switches described since the entire switch assembly with all four track corners can be designed on a single switching disc which, for a T-type switch similar to that shown in FIG. 4, can be turned to a position in which it alternately provides movement straight ahead or, for a truck into an angle-switch of the same type as that shown in FIG. 1.

An alternative to the switching discs described is shown in FIG. 9, wherein switches are arranged on slides 41 which have a track for both straight-ahead movement and for switching to one side. These slides, a common slide, or one for every corner can be arranged with a T-type switch, suitably at an angle of 45 degrees to the direction of the two tracks. If a slide is moved in the direction of the arrow a straight track is secured. The slides can be driven from an external source of power or actuated mechanically from the truck and, if desired, in a manner which is similar to that used to drive the switching discs.

In FIG. 10 is shown a device in which the switching is accomplished with a movable block 42 connected to a lever designed so that when the front wheel has passed the lever the block with its parallel guides is moved to one of the positions shown by the broken lines, whereupon a firm guidance is provided for the wheels, which after change in direction, become the rear wheels of the truck.

Having thus described several embodiments of the invention, it is obvious that the same is not to be restricted thereto, but is broad enough to come within the scope of the claims appended hereto.

What I claim is:

1. A device for use with a switch for a track system for trucks equipped with running wheels which rotate around axles that are arranged at right angles to the plane of the track, said switch being used to transfer a truck from one track to a crossing or branch without swivelling the truck or requiring the stopping of it, characterized in that at least one of the crossing or branched points there are provided guides which permit both a linear movement in the original direction of the track and a movement along a curved line during and for switching in a direction of movement different from that originally pursued by the truck, the guides including rear portions, the guides during the switching being so actuated that the rear portions, viewed in the direction of truck travel, are brought to the switching position only after the front wheels have passed them.

2. A device for use with a switch for a track system for trucks equipped with front and rear running wheels which rotate around axles arranged at right angles to the plane of the track, said switch being used to transfer a truck from a main track to a branch track at an angle without requiring swivelling of the truck, guides provided at the junction of the main track and branch, said guides being adapted to permit both a linear movement in the original direction of the main track and a movement along a curved line during and for switching in a direction of movement different from that originally pursued by the truck, the guides consisting of pivoted flaps swingable toward or away from the entrances to the branch track from the main track, and means operative by the passage of the front wheels of the truck to cause at least one of the guides to swing away from the entrance to the branch track and permit the rear wheels to follow the front wheels in pursuing a course along the branch track without requiring rotative movement of the body of the truck.

3. In a switching device, a track having a straight section and a branch section extending off at an angle to the straight section, said branch section having an entrance through which the wheels of a truck pass to leave the straight section of the track and enter the branch section, a pivoted plate constituting a closure for the entrance, means for normally maintaining the plate in an entrance-blocking position, an element positioned in the path of travel of wheels carried by the truck on axles perpendicular to the plane of the track, said element being moved by the front wheels of the truck when such wheels pass the element, and means coupling the element to the plate whereby the plate will be moved out of the entrance to the branch track section to permit the passage of the rear wheels of the truck upon the actuation of the said element by the passage of the front wheels.

4. In a switching device according to claim 3, wherein the element is an inclined plate that is depressed by the front wheels of the truck when the same pass over it, spring means for biasing the plate upwardly, the pivoted plate having a slotted arm, the inclined plate having a pin entering the slot in the arm to thereby swing the pivoted plate downwardly and away from the entrance to the branch track upon the depression of the pivoted plate by the front wheels of the truck.

5. In a switching device according to claim 3, wherein the pivoted plate closes the entrance to one of a pair of tracks and a second pivoted plate closes the entrance to a second of the pair of tracks, the actuating element being a pivoted flap located between the pivoted plates, pull-exerting means coupling the flap to the pivoted plates so that both of the pivoted plates will be moved away from the entrances to both of the tracks in the pair when the front wheels of the truck contacts with the flap.

6. In a switching device, a track having a straight section and a section which branches off at an angle, said branch section having an entrance through which the wheels of a truck pass to enable the truck to leave the straight section of the track and enter the branch thereof, a hinged plate serving as a closure for said entrance, an actuating bar connected to the plate, spring means biasing said bar to cause it to normally maintain the plate in entrance-blocking position, said bar being positioned in the path of travel of wheels carried by the truck so that said bar will be depressed by the front wheels of the truck and will lower the plate so that the entrance to the branch will then be opened to permit of the passage of the rear wheels of the truck through it.

References Cited

UNITED STATES PATENTS

| | | | |
|---|---|---|---|
| 748,328 | 12/1903 | Wilke | 104—98 |
| 758,399 | 4/1904 | Wilke | 104—98 |
| 1,288,222 | 12/1918 | Schmidt | 246—378 X |
| 1,812,139 | 6/1931 | Clark | 246—273 |
| 1,878,234 | 9/1932 | Goodman. | |
| 2,469,575 | 5/1949 | Ralston et al. | 104—130 X |
| 3,094,941 | 6/1963 | Hellner | 104—130 |

FOREIGN PATENTS 886,454   1/1962   Great Britain.

ARTHUR L. LA POINT, *Primary Examiner.*

J. E. BABER, *Assistant Examiner.*